United States Patent [19]

Dick

[11] Patent Number: 5,562,192

[45] Date of Patent: Oct. 8, 1996

[54] ELECTRONIC CLUTCH CONTROL MECHANISM FOR A VEHICLE TRANSMISSION

[75] Inventor: Joseph A. Dick, Ft. Wayne, Ind.

[73] Assignee: Dana Corporation, Toledo, Ohio

[21] Appl. No.: 333,061

[22] Filed: Nov. 1, 1994

[51] Int. Cl.[6] ................................................. F16D 27/00
[52] U.S. Cl. ........................... 192/84.1; 180/233; 192/94
[58] Field of Search ................................. 192/84 R, 94, 192/20; 180/248, 233

[56] References Cited

U.S. PATENT DOCUMENTS

| | | |
|---|---|---|
| 1,828,348 | 10/1931 | Turnbull . |
| 2,621,494 | 12/1952 | Cross . |
| 3,235,045 | 2/1966 | Pop ........................ 192/94 X |
| 3,840,309 | 10/1974 | Eckes et al. . |
| 3,978,829 | 9/1976 | Takahashi et al. . |
| 4,627,825 | 12/1986 | Bruss et al. . |
| 4,648,345 | 3/1987 | Wham et al. . |
| 4,865,173 | 9/1989 | Leigh-Monstevens et al. ...... 192/94 X |
| 4,895,236 | 1/1990 | Sakakibara et al. .................. 192/94 X |
| 5,090,944 | 2/1992 | Kyo et al. . |
| 5,199,325 | 4/1993 | Reuter et al. . |
| 5,267,635 | 12/1993 | Peterson et al. .......................... 192/94 |
| 5,353,902 | 10/1994 | Flowtow et al. ...................... 192/84 R |

*Primary Examiner*—Rodney H. Bonck
*Attorney, Agent, or Firm*—Oldham & Oldham Co., LPA

[57] ABSTRACT

The present invention is directed to an electronic clutch control mechanism for use in a vehicle transmission such as a four wheel drive transfer case which is utilized to control engagement of a clutch between two wheel drive, automatic ("on demand" four wheel drive), and "part-time" four wheel drive operating modes.

5 Claims, 3 Drawing Sheets

ELECTRONIC CLUTCH CONTROL MECHANISM FOR A VEHICLE TRANSMISSION

BACKGROUND OF THE INVENTION

The present invention relates generally to vehicle transmissions and, in particular, to a vehicle transmission such as four wheel drive transfer case which includes an electronic control mechanism for clutch engagement.

Four wheel drive (4WD) systems for vehicles are becoming increasingly popular, due to the enhanced traction capabilities that such systems can provide in inclement weather or off highway conditions over conventional 2WD systems. Such 4WD systems generally include a torque transfer case which can either be integral with or separate from the main transmission, a rear output shaft connected to drive the vehicle rear wheel, a front output shaft connected to drive the vehicle front wheels, and means for drivingly connecting the input shaft to the front and rear output shafts.

In one type of 4WD system known as a "part-time" system, when in a 4WD mode, there is a direct drive connection between the front and rear output shafts of the transfer case. This direct drive connection does not permit the transfer case to accommodate different front and rear wheel speeds which can occur when turning the vehicle. Accordingly, the 4WD mode is generally used only on a "Part-time" basis, such as when lower friction road surface conditions, e.g., wet or snow covered pavement, may require increased traction capabilities. When turning the vehicle under these conditions, the lower friction road surface allows a limited amount of slip between the slightly faster spinning front wheels and the road surface. Otherwise, turning such a vehicle on a higher friction surface, such as dry pavement, results in what is known as "front wheel hop".

The transfer case also generally includes a shifting means operable by the vehicle driver for selecting whether the vehicle is to be operated in either 2WD or "part time" 4WD mode. Also, such shifting means often enables the driver to select between a "high range" 4WD mode and a "low range" 4WD mode. In the past, such shifting means typically included an all-mechanical arrangement wherein a driver operated shift lever was coupled to axially shift (via a shift fork) an internal shift sleeve in transfer case between the various operating modes. However, such systems require periodic lubrication and nevertheless exhibit a propensity to wear or lock up in time due to the constant physical interconnection between the plurality of moving parts. More recently, "part-time" 4WD transfer cases have been provided with electronic actuators for effecting the above mechanical shifting operations.

Some vehicles are provided with a "full time" 4WD system which is permanently engaged in all driving conditions. In this type of system, which has become known as an "all wheel drive" (AWD) system, the transfer case is generally provided with an interaxle differential for dividing torque between the vehicle front and rear differentials. The interaxle differential accommodates different front and rear wheel speeds when turning the vehicle, and thus enables the system to remain permanently engaged in all operating conditions. Also, in order to prevent excessive slipping between the front and rear wheels, and transfer cases typically include a selectively engageable clutch means which is operative to lock the interaxle differential upon sensing a predetermined slippage between the front and rear output shafts of the transfer case.

SUMMARY OF THE INVENTION

The present invention is directed to an electronic actuator and control mechanism for use in a vehicle transmission such as a 4WD transfer case. In the preferred embodiment, the transfer case includes a clutch control mechanism which is utilized to electromagnetically control engagement of a clutch between 2WD, automatic (i.e. "on demand" 4WD), and "part time" 4WD operating modes. More specifically, the clutch control mechanism includes a rotor fixed to a shaft containing a clutch unit. A fixed stator surrounds the rotor and is connected to an electronic controller which receives input from an operator interface or a plurality of sensors. In response to the input data the controller generates electrical signals to the stator so as to create a rotating electromagnetic flux to control the movement of the rotor. In this manner the rotation of the rotor and, in turn, the operation of the clutch can be controlled without direct mechanical connection to engage the front drive shaft.

Accordingly it is an object of the present invention to provide a device for controlling the actuation and rotation of a clutch unit without direct mechanical interconnection between the control mechanism and the rotor mounted on motor shaft 80.

Another advantage of the present control mechanism relates to the precise control which can be achieved when the system is operated in the "on demand" 4WD mode.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
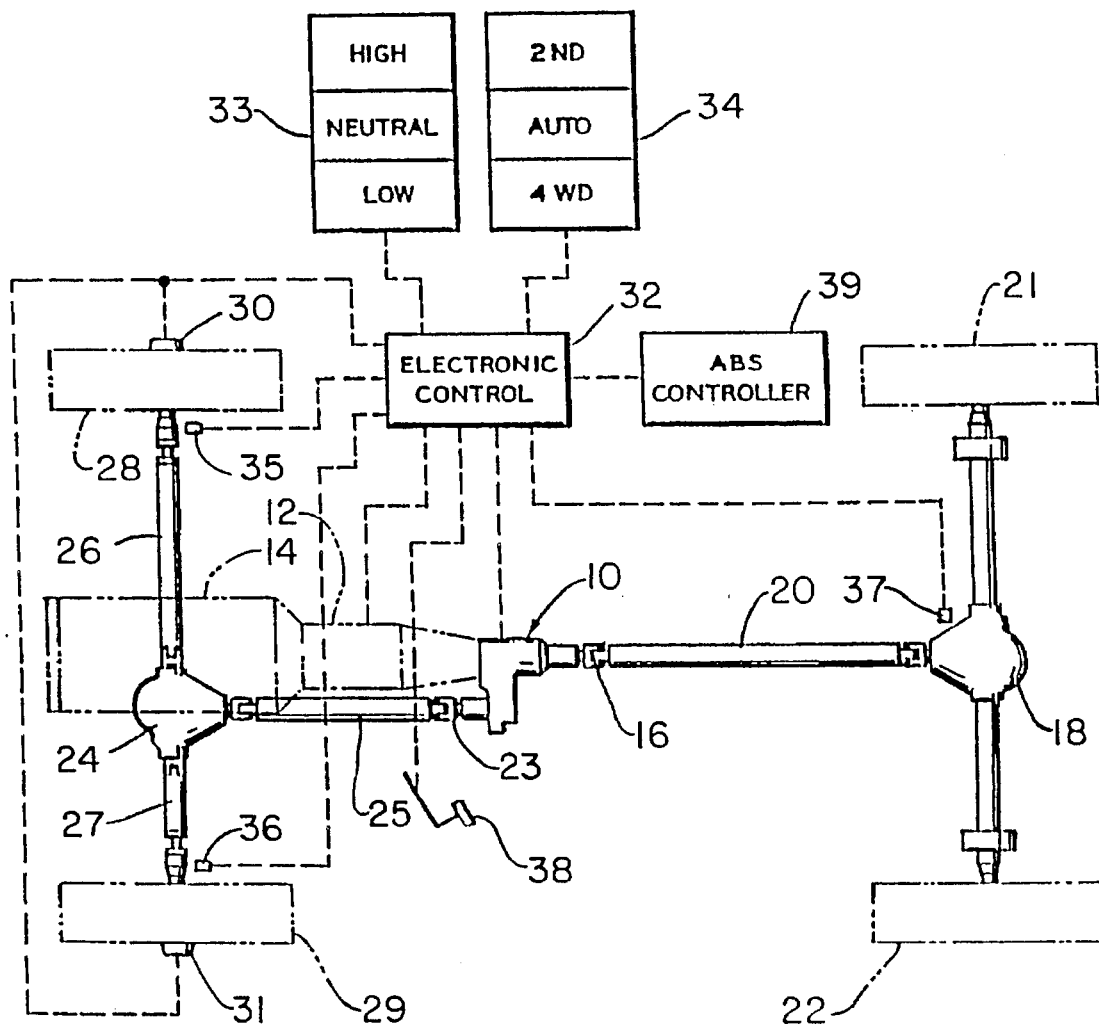
FIG. 1 is a top plan view of a four-wheel drive system including an electronically controlled transfer case according to the present invention.

Referring first to FIG. 1, there is shown a vehicle four wheel drive system which utilizes a transfer case incorporating the clutch control mechanism of the present invention. As shown in FIG. 1, a transfer case 10 is secured to the rear of a main transmission 12 (shown in phantom) which in turn is coupled to a drive engine 14 (also shown in phantom). As will be discussed, the transmission 12 is provided with an output shaft which is coupled to an input shaft of the transfer case 10. The transfer case 10 includes a rear output shaft which is connected at 16 to a rear drive shaft 20 which in turn is connected to a rear differential 18. The rear differential 18, which can be a limited slip type, divides torque from the drive shaft 20 between the rear wheels 21 and 22.

The transfer case 10 is provided with a front output shaft which is connected at 23 to a front drive shaft 25 which in turn is connected to a front differential 24. The front differential 25, which can also be a limited slip type, divides torque received from the front drive shaft 25 between front axles 26 and 27 which are connected to vehicle front wheels 28 and 29 by automatic hub locks 30 and 31, respectively. The hub locks can be vacuum actuated.

Also shown in FIG. 1 are certain electrical connections (shown as dashed lines) to a microprocessor-based electronic control which is represented by a block 32. The transfer case 10 can be operated in various operating modes are selected by the vehicle driver via control switches 33 and 34, which are typically located in the vehicle interior within convenient reach of the driver. Typically, one switch 33 is used to shift the transfer case between high range, neutral, and low range, while a second switch 34 allows the driver to select between three different operating modes: two wheel drive (2WD), "on demand" four wheel drive (AUTO), and "part time" four wheel drive (4WD). Each switch can include status lights to provide a visual indicator of the present operating mode to the driver. Also, when effecting a mode change such as a range shift, the respective light can be flashed until the shift is complete. In addition to being connected to control the transfer case in a manner as will be discussed, the control is also connected to generated activation signals to the hub locks 30 and 31 when the "on demand" or "part time" operating modes are selected.

To effect the desired control of the transfer case 10 and the hub locks 30 and 31, the control 32 is connected to receive a plurality of input signals. The control 32 receives signals representing the individual front wheel speeds from speed sensors such as those shown at 35 and 36, and a signal representing an average rear wheel speed (vehicle road speed) from a single rear speed sensor 37 located at the rear differential 18 or, alternatively, in the transfer case 10. The speed sensors 35, 36 and 37 can be part of an ABS (anti-brake system) control, or they can be provided solely for use in controlling the transfer case. As will be discussed, the two front sensors are advantageously used in the "AUTO" mode to determine front steering angle which, in conjunction with the vehicle road speed, functions to determine the acceptable slip threshold of the rear wheels. In some situations, the two front speed sensors 35 and 36 may be replaced with a single front speed sensor located in the transfer case and then, if desired, obtain the steering angle information from another source (such as the steering gear).

The control 32 also receives a status signal from the transmission 12 which informs the control when the main transmission is in a "neutral" mode. As will be discussed the system only allows a shift between high and low range 4WD and neutral when the transmission 12 is in neutral. The control further receives a brake status signal from the vehicle brake system indicating when a brake pedal 38 has been actuated. The control 32 can also be configured to supply a status signal to an ABS controller 39 to indicate when the system is operating in either the high or low 4WD modes.

Figure 2:
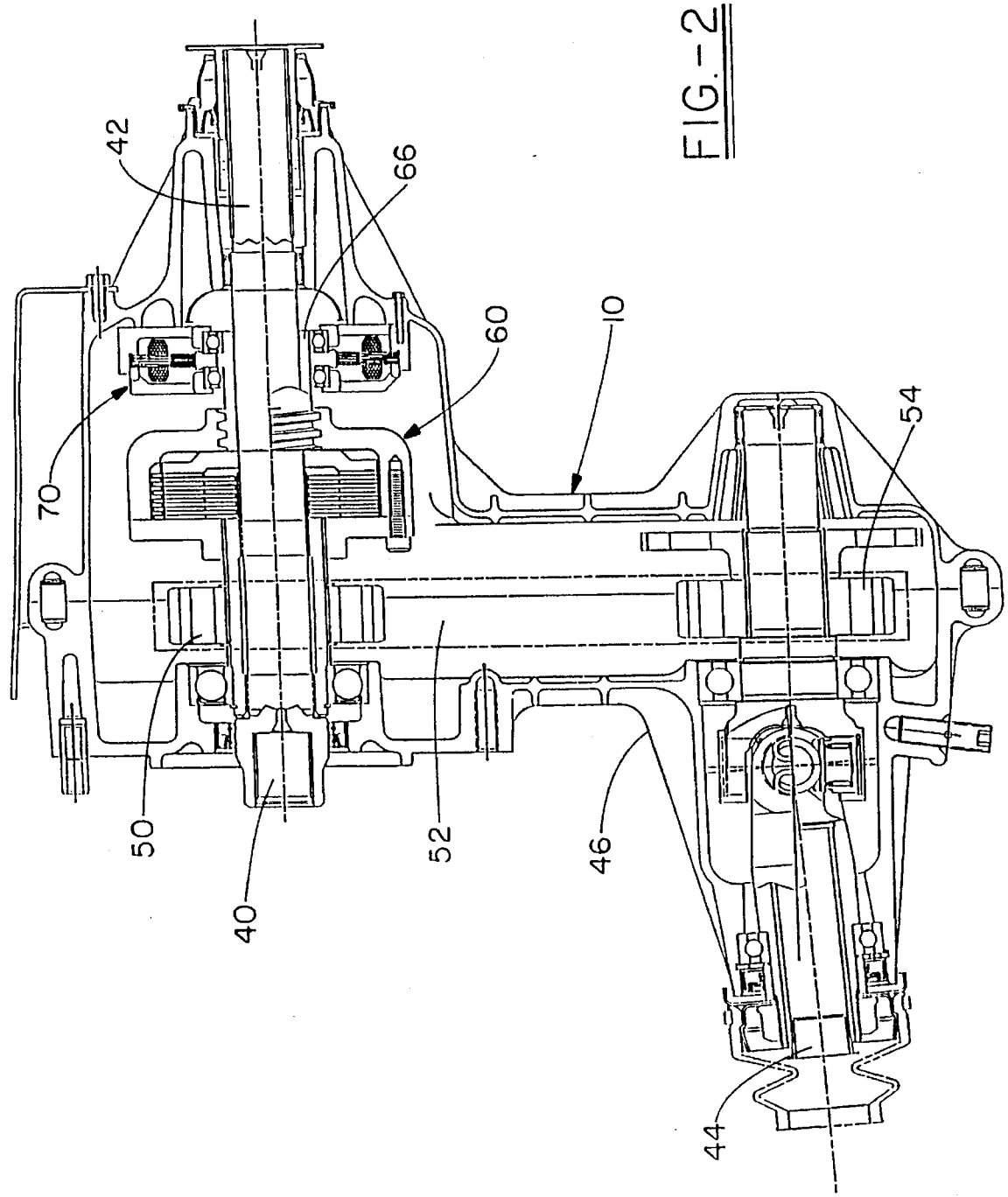
FIG. 2 is a sectional view through the transfer case of FIG. 1.

As shown in FIG. 2, the transfer case 10 includes an input shaft 40 coupled to the output shaft of the vehicle transmission 12 (shown in FIG. 1), a rear torque transfer or output shaft 42 for connection to the rear drive 20, and a front output shaft 44 for connection to the front drive shaft 25.

The input shaft 40 is rotatably supported at the forward end of a transfer case housing 46 which in certain applications utilize a planetary gear reduction assembly (not shown) used to achieve the low gear operating range. The rear output shaft 42 extends forwardly into the housing 46 and typically carries at its forward end an axially moveable range shift sleeve (also not shown) for engagement with either the input shaft 40, or the planet carrier discussed infra. When the rear output shaft 42 is connected to the input shaft 40, there is a direct drive connection between the input shaft 40 and the rear output shaft 42 to define the high speed range. When connected to the planet carrier, the planetary gear assembly introduces a predetermined gear reduction to define the low speed range.

Figure 3:
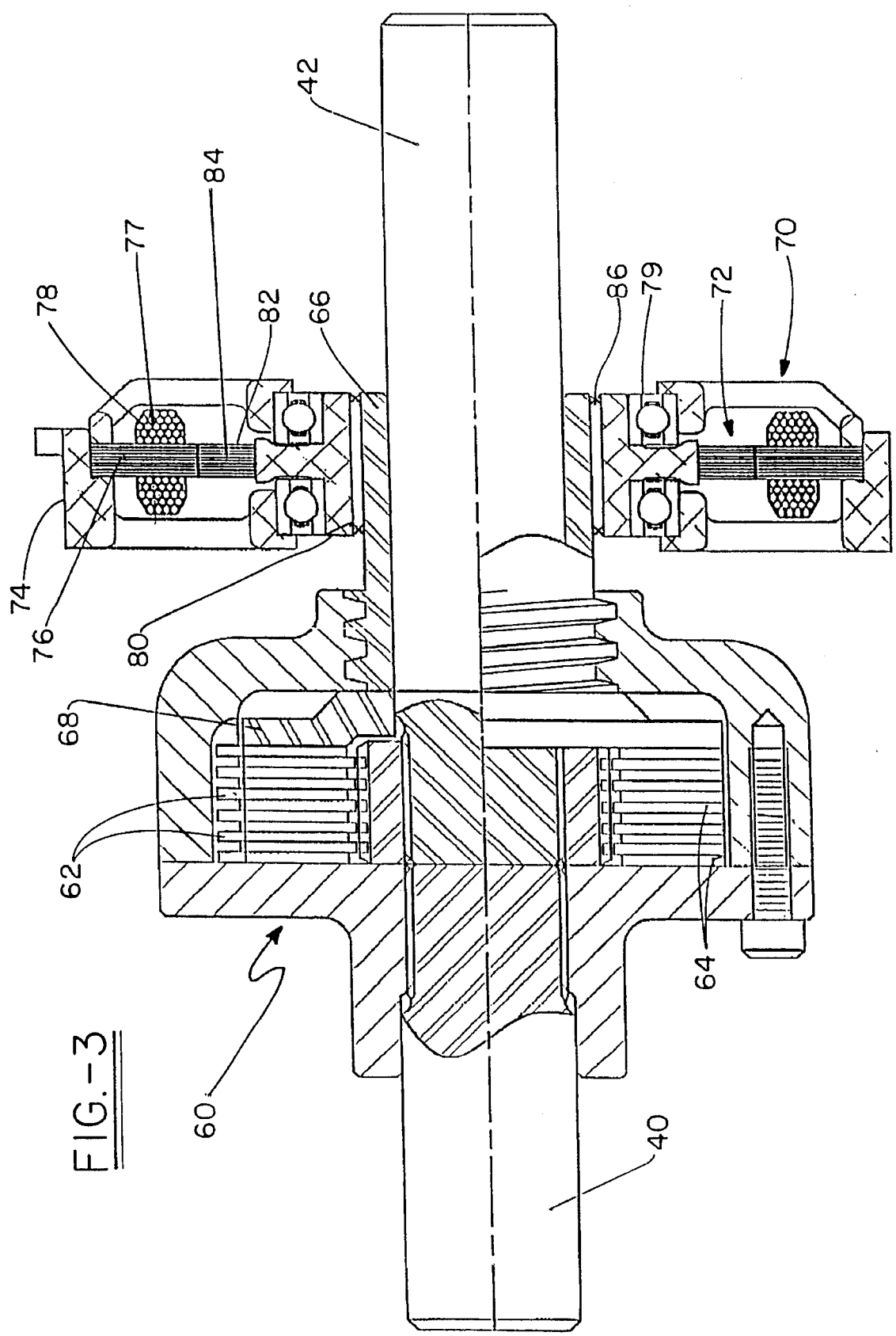
FIG. 3 is an enlarged fragmentary sectional view of the portion of FIG. 2 which illustrates the clutch control mechanism.

A first drive sprocket 50 is rotatably supported on a central portion of the rear output shaft 42 and is connected by a drive chain 52 to drive a second drive sprocket 54 rotatably supported within the transfer case housing 46 and connected to drive the front output shaft 44. As best illustrated in FIGS. 2–3, a multi-disc 4WD clutch 60 is provided to control torque input to the front output shaft 44, and includes a first group of clutch plates 62 which, while axially moveable, are secured for rotation with the first drive sprocket 50. A second group of clutch plates 64 are secured for rotation with the rear output shaft 42, but are also axially moveable. The bias of the clutch is applied by the advancement of a hollow sleeve or clutch actuating sleeve 66 against thrust plate 68 which is controlled by the clutch control mechanism generally 70. The control mechanism 70 is connected to receive operating signals from the control 32.

The clutch control mechanism 70 utilizes a coaxial electric rotary motor arrangement having a large torque capacity. Motor 72, in the preferred embodiment is a three phase, multiple, variable reluctance DC motor operated by control 32. DC current is alternatively applied to successive windings to cause a predetermined rotation of the rotor. Rotation of the motor in one direction causes the associated motor shaft 80 to advance clutch sleeve 66 into contact with the thrust plate 68 to engage clutch 60. As shown in FIGS. 2 or 3, motor 72 includes a multi-piece motor housing 74 fixed relative to the transfer case housing 46, and which carries a stacked array of laminated stator plates 76. The plates 76 are provided with a plurality of circumferentially spaced and radially inwardly extending poles 77 individually wrapped with windings 78. The motor housing 74 carries a roller bearing 79 which rotatably supports a hollow motor shaft 80. The outer portion of the shaft 80 carries a rotor 82 comprising a stacked array of laminated rotor plates 84 having an outer edge spaced from the inner edge of the stator plates 76 by an air gap.

Rotation motion of the motor shaft 80 is transmitted to the rotatable clutch actuating sleeve 66 via splines 86. Clutch sleeve 66 is restrained from rotation with the motor housing 74, and includes a forward end coupled to the clutch thrust plate 68 by a thrust bearing (not shown). The thrust plate 68 exerts an axial force on the clutch pack via a Bellville spring.

The following paragraphs summarize the operation of the drive shafts in various operating modes.

2WD—In this mode, the front hub locks 30 and 31 are disengaged and the 4WD clutch 60 is fully disengaged. All of the driving torque is directed to the rear wheels. When a driver at any vehicle speed has selected 2WD via the switch 34 shown in FIG. 1, the control 32 generates a disengage signal to the 4WD clutch, which causes the clutch control mechanism 70 to fully retract the clutch actuating sleeve 66 and disengage the clutch 60. Immediately following, the control 32 sends a disengage signal to the front hub locks 30 and 31. The system will remain in this state until a different operating mode is selected by the driver.

4WD—In this mode, the hub locks 30 and 31 are engaged, and the 4WD clutch 60 is fully engaged. The front and rear drive shafts are rigidly connected (i.e., no interaxle differential), so that torque is distributed to the front and rear wheels based upon the traction available at each wheel. When 4WD mode is selected at any vehicle speed by the driver from the 2WD mode, the control 32 generates an engage signal to the clutch control mechanism 70 to fully advance the clutch actuating sleeve 66 and engage the clutch

60. After full engagement of the clutch, and synchronization of the front axles and wheels, the control sends an engage signal to the front hub locks 30 and 31. The system then remains in this state until a different operating mode is selected by the driver.

AUTO ("on-demand" 4WD)—In the AUTO mode, the hub locks 30 and 31 are engaged, and the 4WD clutch 60 is, as will be discussed, in a "ready" position. If the vehicle is in 2WD mode, and the AUTO mode is selected at any vehicle speed, the controller generates an engage signal for the 4WD clutch 60. The clutch is then engaged sufficiently to synchronize the front output of the transfer case with the front wheels, after which the controller sends an engage signal to actuate the front hub locks. Once the hub locks have engaged, the control disengages the four wheel drive clutch. Thereafter, the control will continuously monitor rear wheel slip. When the control sense excessive rear wheel slip, the 4WD clutch automatically engages to transmit the required level of torque to the front axle for as long as is needed. When the rear wheel slip is no longer present, the clutch disengages, and remains disengaged until rear wheel slip is detected. To provide for full ABS compatibility, in the event the brakes are engaged while in the AUTO mode and the vehicle speed is above a predetermined amount (e.g., six miles per hour), the 4WD clutch is immediately disengaged.

In operation, to disengage the clutch (for 2WD), the motor 72 is operated to axially shift the clutch actuating sleeve 66 to its most rearward position. To fully engage the clutch (for part-time 4WD), the clutch actuating sleeve 66 is moved to a forward position wherein the effective holding torque of the clutch is such that the clutch is in the "locked" state. In an AUTO mode, the sleeve is moved to a "ready" position just before partial engagement of the clutch occurs. Alternatively, the AUTO mode could position the clutch at a "slight bias" position, such that some torque will always be transmitted to the front wheels when in this mode. Additional rotation of clutch sleeve 66 engage the clutch 60 for torque transmission to the front wheels. In all of the above situations, when power is removed from the motor 72, the clutch sleeve 66 will maintain its position, since the internal frictional characteristics prevent the sleeve 66 from back driving the motor shaft. This also insures that clutch engagement/disengagement will be maintained in the event of motor failure or power loss.

While in accordance with the patent statutes, the best mode and preferred embodiment of the invention have been described, it is to be understood that the invention is not limited thereto, but rather is to be measured by the scope and spirit of the appended claims.

I claim:

1. A clutch control assembly for actuating the clutch of a motor vehicle assembly comprising:
    a rotating torque transfer shaft;
    at least one sensor for detecting the speed and rotation of said torque transfer shaft;
    a rotary electric motor coaxially mounted relative to a torque transfer shaft, said motor having a fixed stator;
    a rotatable hollow motor shaft surrounding and rotating with said torque transfer shaft, said motor shaft having a rotor fixedly secured to said motor shaft outer surface, said rotor and said stator separated by an air gap;
    a hollow sleeve surrounding said torque transfer shaft and axially movable between a first and second axial position, said hollow sleeve rotating with said motor shaft;
    a controller for receiving impulses from said at least one sensor and discharging signals to said stator, in response said stator emits impulses which apply torque to the rotor so as to vary the speed of said motor shaft and hollow sleeve relative to said torque transfer shaft to control axial movement of said hollow sleeve between said first and second axial positions.

2. The clutch control assembly as recited in claim 1, wherein said impulses are an electromagnetic flux.

3. The clutch control assembly as recited in claim 1, wherein said clutch serves to operate a transfer case in a two or four wheel drive mode.

4. The clutch control assembly as recited in claim 1, wherein said clutch is a multi-plate clutch.

5. A clutch assembly for a motor vehicle assembly comprising:
    a rotating torque transfer shaft;
    a clutch attached to and rotating with said torque transfer shaft;
    at least one sensor for detecting the speed and rotation of said torque transfer shaft;
    a rotary electric motor coaxially mounted relative to a torque transfer shaft, said motor having a fixed stator;
    a rotatable hollow motor shaft surrounding and rotating with said torque transfer shaft, said motor shaft having a rotor fixedly secured to said motor shaft outer surface, said rotor and said stator separated by an air gap;
    a hollow sleeve surrounding said torque transfer shaft and axially movable between a first axial position engaging said clutch and a second nonengaging axial position, said hollow sleeve rotating with said motor shaft;
    a controller for receiving impulses from said at least one sensor and discharging signals to said stator, in response said stator emits impulses which apply torque to the rotor so as to vary the speed of said motor shaft and hollow sleeve relative to said torque transfer shaft to control axial movement of said hollow sleeve between said first and second axial positions.

* * * * *